United States Patent Office 3,318,824
Patented May 9, 1967

3,318,824
ISOCYANATE-CONTAINING VINYL ETHER FOAMS
Neil Bonnette Graham, St. Hilaire, Quebec, Canada, assignor to Canadian Industries Limited, Montreal, Quebec, Canada, a corporation of Canada
No Drawing. Filed Nov. 30, 1964, Ser. No. 414,835
Claims priority, application Great Britain, Dec. 30, 1963, 51,196/63
9 Claims. (Cl. 260—2.5)

This invention relates to improved compositions suitable for the production of foamed cellular polymeric materials and to the improved foamed cellular polymeric materials obtained therefrom.

In Canadian application Ser. No. 873,718 filed by W. D. S. Bowering, N. B. Graham and J. D. Murdock on Apr. 20, 1963 (see British Patent No. 991,970, published May 12, 1965, which corresponds to the Canadian application), there are described foamable compositions of a novel type which comprise at least one polymerizable vinyl ether containing at least two vinyl groups per molecule, a foaming agent, an acidic catalyst and, optionally, at least one compound reactive with said vinyl ether as a polyhydric phenol, and aliphatic polyhydric alcohol, an epoxidized material, a polycarboxylic acid, a polyamide, a polycarbamate or an α,β-monoethylenically unsaturated compound. These compositions yield foamed cellular polymeric materials which are superior to the known polyurethane and polystyrene foams in many respects.

Despite their many useful properties, however, some of the aforesaid novel foams tend to break down when exposed to conditions of high humidity. The foams which exhibit hydrolytic instability are those prepared from acyclic vinyl ethers and cyclic vinyl ethers in which the groups linking the vinyl ether rings are ester or acetal. The hydrolytic instability restricts the use of the aforesaid foams to relatively dry applications. Hydrolytic stability is of importance in construction applications where materials should be stable for a period of thirty years.

It has now been found that if, in the above type of foamable compositions, an organic isocyanate is included as a minor ingredient, the resulting novel foams have greatly improved hydrolytic stability.

It is therefore the primary object of this invention to provide improved foamable compositions and improved foamed cellular polymeric materials based on polymerizable vinyl ethers containing at least two vinyl groups per molecule in admixture with vinyl ether-reactive compounds. Another object is to provide such foamed cellular polymeric materials possessed of the desirable property of hydrolytic stability. Additional objects will appear hereinafter.

The foamable compositions of this invention comprise (1) a polymerizable vinyl ether containing at least two vinyl groups per molecule, (2) a vinyl ether-reactive compound, (3) a volatile foaming agent, (4) a catalyst, and (5) an organic isocyanate. The chemical interaction of the ingredients of said compositions produces the improved foams of this invention.

The relative proportions of the vinyl ether and vinyl ether-reactive ingredient in the compositions are such that the number of vinyl groups in the vinyl ether is always greater than the number of vinyl ether-reactive groups in the vinyl ether-reactive ingredient. The sum of the weights of the vinyl ether and the vinyl ether-reactive ingredient is from 58% to 97% of composition. The foaming agent is present in amounts between 2.0% and 30.0% by weight of the compositions. The catalyst is employed in amounts ranging from 0.005% to 2.0%, by weight of the compositions, but this proportion is adjustable to the temperature of operation and the foam induction period required. The organic polyisocyanate ingredient is employed in amounts ranging from 1% to 10% by weight of the compositions.

The foamable compositions of this invention may also include flame retardants, surfactants, dyes, fillers, stabilizers, antioxidants, plasticisers and viscosity modifiers.

The polymerizable vinyl ethers suitable for use in the foamable compositions are those in which two or more vinyl groups are each joined to an ether oxygen atom. They may have the generic formula selected from

I $$R_3C=CR_1-O-R_1C=CR_3$$
$$\phantom{R_3C=C}|\phantom{R_1-O-R_1C=C}|$$
$$\phantom{R_3}R_2\phantom{C=CR_1-O-R_1C=C}R_2$$

II

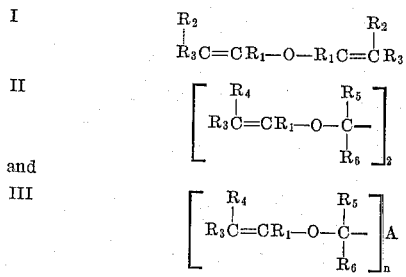

and

III wherein $n$ is an integer of minimum value of 2, $R_1$ and $R_2$ are members selected from the group consisting of hydrogen and alkyl radicals, $R_3$ is a member selected from the group consisting of hydrogen, halogen atoms and hydrocarbyl radicals, $R_4$ and $R_5$ taken together form a member selected from the group consisting of two hydrogen atoms, two alkyl radicals and one alkylene or substituted alkylene radical, $R_6$ is a member selected from the group consisting of hydrogen and alkyl radicals, each individual member $R_1$ to $R_6$ may represent different atoms or radicals when in different locations in the vinyl ether molecule, and A is a linking group having a valence equal to $n$.

Examples of such vinyl ethers are: divinyl ether, diisopropenyl ether, butanediol divinyl ether, propylene oxide/polyol condensates of the formulae

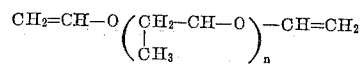

and

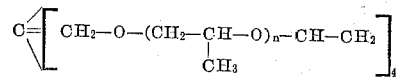

wherein $n$ is any integer, 3,4-dihydro-2H-pyran-2-methyl-(3,4-dihydro-2H-pyran-2-carboxylate) described hereinafter, 1,2-ethanedioxy-bis(3',4'-dihydro-2'H-pyran-2'-carbonyl) of the formula

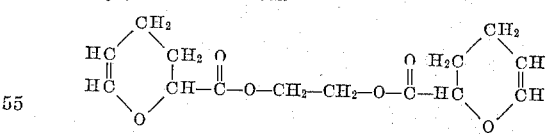

bis-(3,4-dihydro-2H-pyran-2-methyl) succinate of the formula

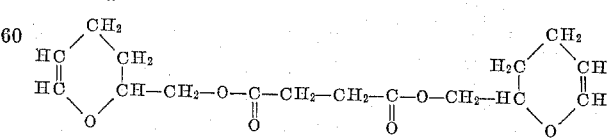

1,2-bis(3',4'-dihydro-2'H-pyran-2'-oxy) ethane of the formula

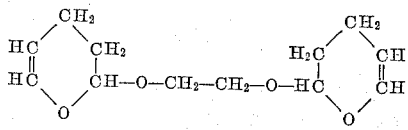

1,1-bis(3',4'-dihydro-2'H-pyran-2'-methoxy) ethane of the formula

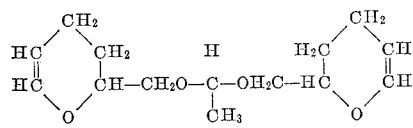

1,2-ethanedioxy-bis(3',4'-dihydro-5'-methyl-2'H-pyran-2'-carbonyl) of the formula

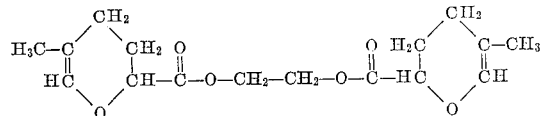

1,2-bis(3',4'-dihydro-5'-methyl-2'H-pyran-2'-oxy) ethane of the formula

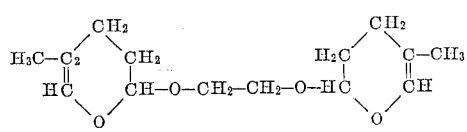

1,1-bis(3',4'-dihydro-5'methyl-2'H-pyran-2'-methoxy) ethane of the formula

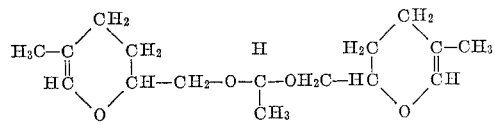

3,4-dihydro-2H-pyran-2-methyl(3,4-dihydro-5-methyl-2H-pyran-2,2-dimethyl) succinate of the formula

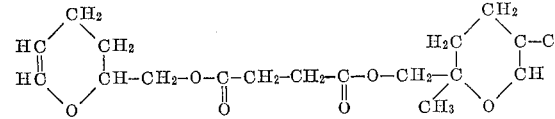

toluene-2,4-bis(3',4'-dihydro-2'H-pyran-2'-methyl) carbamate of the formula

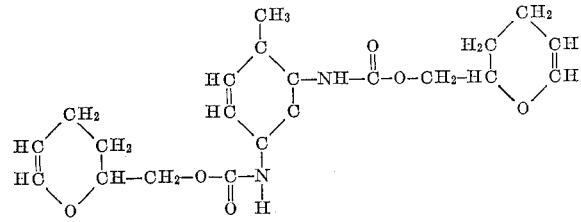

the tri-ester derived from three moles of 2-hydroxymethyl-3,4-dihydro-2H-pyran and one mole of orthophosphoric acid, and the esters derived from 2-hydroxymethyl-3,4-dihydro-2H-pyran and organic polybasic acids such as maleic and adipic acids. It has been found that the straight chain vinyl ethers are more reactive than branched chain or cyclic vinyl ethers. The vinyl ether groups in the molecule may be the same or different. It is desirable that the vinyl ethers do not boil during the foam forming reaction.

The vinyl ether-reactive compounds suitable for use in the compositions of this invention include polyhydric phenols such as resorcinal, phloroglucinol, catechol, hydroquinone and 2:2-di-p-hydroxyphenyl propane; polyhydric alcohols such as ethylene glycol, glycerol, diethylene glycol, 1,5-pentanediol, 1,2,6-hexanetriol and polypropylene glycols; epoxidized materials such as dipentene dioxide, vinyl cyclohexene dioxide, polyallyl glycidyl ether, diphenylolpropane diglycidyl ether, epoxidized polybutadiene and the resinous condensate of epichlorohydrin and 2:2-di-p-hydroxyphenyl propane; polycarboxylic acids such as succinic, adipic, azelaic, maleic, fumaric, itaconic, phthalic, isophthalic, terephthalic, trimellitic, trimesic, chlorendic and polymerized unsaturated fatty acids such as dimer and trimer acids; polyamides such as the di-amide derived from dimerized linseed oil acids and the polyamide derived from isophthalic acid and pentamethylene diamine; polycarbamates such as the condensation products of tolylene diisocyanate and 1,5-pentanediol, and of diphenylmethane 4,4'-diisocyanate and polypropylene glycol of molecular weight 425; and α,β-monoethylenically unsaturated compounds such as 3,4-dihydro-2H-pyran, 2-ethoxy-3,4-dihydro-2H-pyran, 2-alkyl-3,4-dihydro-2H-pyrans, 2-phenyl-3,4-dihydro-2H-pyran, 1-decene, vinyl stearate, lauryl vinyl ether, dibutyl maleate, maleic anhydride, vinyl cyclohexene, alkyl acrylates, alkyl methacrylates and styrene.

Volatile foaming agents suitable for use in the foaming compositions of this invention are those which are soluble or dispersible in the other ingredients of the foaming compositions and are sufficiently volatile that they vaporize during the formation of the foamed polymeric materials. The heat of the catalyzed polymerization reaction causes the foaming agent to boil and the vapour forms bubbles which expand during the polymerization reaction to give a low density foamed polymerized mass. Preferred foaming agents are the halogenated hydrocarbon such as trichloromonofluoromethane, dichlorotetrafluoroethane, trichlorotrifluoroethane, dibromodifluoromethane, dichlorohexafluorocyclobutane, methylene chloride, chloroform, trichloroethylene, carbon tetrachloride and perchloroethylene.

Catalysts suitable for promoting the reaction of the polymer-forming ingredients of the foamable compositions may be either acidic or non-acidic and include all catalysts capable of accelerating the reactions of vinyl ethers with compounds containing active hydrogen atoms.

The acidic catalysts suitable for promoting the reaction include the strong proton-donating acids, such as p-toluenesulphonic acid, and the Lewis acids such as trimethoxyboroxine and boron trifluoride conveniently employed as the etherate, $BF_3 \cdot (C_2H_5)_2O$. Compositions containing very reactive vinyl ethers such as butanediol divinyl ether can be catalyzed by p-toluenesulphonic acid but a Lewis acid catalyst is preferred for those compositions containing 3,4-dihydro-2H-pyranyl compounds including the 3,4-dihydro-2H-pyran-2-methyl-(3,4-dihydro-2H-pyran-2-carboxylate) referred to hereinafter.

Other materials which are suitable as acidic catalytic ingredients are ferric chloride, stannic chloride, phosphorus pentachloride, phosphoric acid, perchloric acid, acetic acid, trifluoroacetic acid, trichloroacetic acid, fluoboric acid, boron trifluoride dihydrate, hydrogen fluoride, antimony pentafluoride, hexafluorophosphoric acid, lead fluoborate, antimony fluoborate, fluosilicic acid, sulphuric acid and silicotungstic acid.

Examples of suitable non-acidic catalysts include iodine and iodine-containing compounds such as iodine chloride, iodine bromide, iodine perchlorate, iodine acetate, iodine triphosphate and iodine triacetate; triphenyl methyl derivatives of anions having a low ester forming tendency, for example triphenylmethyl perchlorate, hexachloroantimonate, chloromercurate, chlorozincate and chloroaluminate; alkyl, acyl and aroyl perchlorate and hexachloroantimonates such as tert-butyl acetyl and benzoyl compounds; and diazonium salts such as diazonium chlorides, fluoroborates and hexachloroantimonates.

It is possible to control the polymerization reaction by employing catalyst combinations e.g. p-toluenesulphonic acid and boron trifluoride or boron trifluoride and trimethoxyboroxine. The solvent in which the catalyst is dissolved also affects the catalyst reactivity, polypropylene glycol solutions of $BF_3 \cdot (C_2H_5)_2O$ being less reactive than xylene solutions of said catalyst. Suitable catalytic amounts range from 0.005% to 2.0% by weight of the compositions, but these amounts are not limitative since the amount of catalyst should be adjusted to the temperaure of operation and the foam induction period required. When Lewis acids are used as catalysts in foaming compositions devoid of phenolic, alcoholic or carboxylic acid ingredients, it is often advantageous to incorporate into the compositions small amounts of co-catalysts such as water, alcohols or carboxylic acids.

The organic isocyanate ingredient is selected from those organic compounds containing at least one isocyanate group in their molecules, said organic compounds being aliphatic, aromatic or arylaliphatic. Suitable organic isocyanates are n-butyl isocyanate, octadecyl isocyanate, phenyl isocyanate, 1-naphthyl isocyanate, tolylene 2′4-di-isocyanate, mixtures of tolylene 2:4 and 2:6-di-isocyanates, diphenylmethane di-isocyanates, 4,4′-di-isocyanate-3-methyl-diphenylmethane, m- and p-phenylene di-isocyanates, chlorophenylene - 2:4-di-isocyanate, 2:4:6-tri-isocyanate-toluene, 4:4:4′-triphenylmethane tri-isocyanate and 2:4:4′-tri-isocyanate-diphenyl ether.

Suitable flame retardants for incorporation in the foamable compositions include trichloroethylphosphate, tris(dibromopropyl)phosphate, 2:2-bis-(3′,5′-dibromo - 4′-hydroxyphenyl)propane, chlorendic acid and polyvinyl chloride, with or without antimony oxide. The phenolic compound and the chlorendic acid serve both as flame retardants and vinyl ether-reactive materials.

The preferred surfactants are those of the silicone type, examples of which are disclosed in Belgian Patent Nos. 582,362 and 584,089, being of the siloxane oxyalkylene copolymer type.

The addition of organic isocyanates to vinyl ether-containing foamable compositions which normally produce foams unstable in the presence of water results in foams with greatly increased hydrolytic stability, and the foams so prepared compare favorably with the well known urethane foams.

The foams of this invention in the flexible form may be used for upholstery, mattresses, etc. In the rigid form they are eminently suited for heat insulation and sound absorption, either in closed cavities or as enveloping blankets.

The ingredients of the foamable compositions may simply be mixed by stirring in a vessel and then quickly pouring into a mould. In some cases it is convenient to heat the composition in the mould to assist in the formation of the foam. The foaming ingredients may also be mixed in the space which is to be filled with foam if it is suitably shaped. When such stirred mixing is used, it is highly desirable that a surfactant be added to the compositions in order to give foams of small bubbles. However, a surfactant is not always essential. For example, in certain foam-dispensing machines, the ingredients are mixed under pressure using a foaming agent which is gaseous at the mixing temperature, the pressure being controllably released, and the "frothed" mixture is then dispersed to the point of use. In such a "frothing" machine, a surfactant is not essential.

However, in ordinary dispensing machines wherein the foaming compositions are dispensed before foaming starts, the use of a surfactant is often desirable. In many recipes, it has been found that reduction of the amount of surfactant to the point where the bubbles just burst as polymerization is complete gives foams of the known "open cell" structure.

The invention will be more fully illustrated by the following Examples, but it is to be understood that it scope is not to be limited to the specific embodiments shown.

A preferred vinyl ether used in the Examples is 3,4-dihydro - 2H-pyran-2-methyl - (3,4-dihydro - 2H-pyran-2-carboxylate) of the following formula:

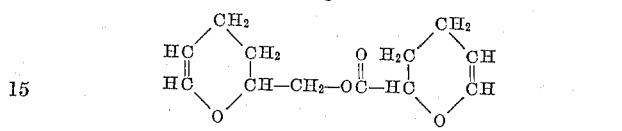

It may be prepared by the self-condensation of acrolein dimer (2-formyl-3,4-dihydro-2H-pyran) in the presence of about 0.3% of aluminum isopropoxide, the reaction temperature being held at 45° C. for 6 hours. A purified product may be obtained by flash distillation in a falling film still at 150° C. under vacuum, but satisfactory foams can be obtained with the undistilled product.

EXAMPLES 1 TO 4

A series of four compositions was prepared from the following ingredients.

Mixture A:                                                          Grams
  3,4-dihydro - 2H-pyran - 2-methyl - (3,4-dihydro - 2H-pyran - 2-carboxylate) _____ 200
  2:2-di-p-hydroxyphenyl propane _____ 50
  Trichloromonofluoromethane _____ 50
  Siloxane oxyalkylene copolymer type silicone surfactant _____ 1
Mixture B:
  50% aqueous solution of fluoboric acid _____ 9.1
  30% aqueous solution of fluosilicic acid _____ 0.9
  Diphenylmethane di-isocyanate in amounts shown in Table I.

The foam was prepared by adding the diphenylmethane di-isocyanate to Mixture A and stirring for 30 seconds. The catalyst Mixture B was then added and stirring was continued for 6 seconds and the composition was poured into a mould. The characteristics of the resulting foams are shown in Table I.

TABLE I

| Example | Dipenyl-methane diiso-cyanate, percent | Core density, lbs./cu. ft. | Dimensional Stability [1] | | | Compression Strength | | | | Induction time, sec. | Rise time, sec. | Tack free time, sec. |
|---|---|---|---|---|---|---|---|---|---|---|---|---|
| | | | Change after 48 hours, percent | Change after 30 days, percent | Time to collapse, days | Perpendicular to rise | | Parallel to rise | | | | |
| | | | | | | Compression | | Compression | | | | |
| | | | | | | 10%, lb./sq. in. | 20%, lb./sq. in. | 10%, lb./sq. in. | 20%, lb./sq. in. | | | |
| 1 | 0 | 1.7 | +13 | | 12 | 7.0 | 8.0 | 20.0 | 21.0 | 9 | 20 | 20 |
| 2 | 2 | 1.5 | +6 | | 21 | 7.0 | 8.5 | 17.5 | 18.0 | 6 | 15 | 15 |
| 3 | 4 | 1.6 | +5 | | 20 | 10.0 | 10.0 | 20.0 | 19.5 | 16 | 40 | 40 |
| 4 | 6 | 1.6 | 0 | +6 | ([2]) | 9.0 | 9.0 | 19.0 | 18.0 | 21 | 45 | 55 |

[1] Dimensional stability was determined by exposing a 2 inch cube of the foamed product to conditions of 100% relative humidity and 70° C. temperature and measuring the percentage volume change.
[2] No sign of collapse after 30 days.

EXAMPLES 5 TO 9

A series of five compositions was prepared from the following ingredients.

Mixture A:
                                                                    Grams
  3,4 - dihydro - 2H - pyran - 2 - methyl - (3,4-dihydro - 2H - pyran - 2 - carboxylate _____ 200
  2:2-di-p-hydroxyphenyl propane _____ 50
  Low molecular weight resinous condensate of Mixture A: Grams
  2:2 - di - p - hydroxyphenyl propane and epichlorohydrin _____ 20
  Siloxane oxyalkylene copolymer type silicone surfactant _____ 2
  Trichloromonofluoromethane _____ 12
Mixture B: Grams
  Phenolic novolak resin _____ 27
  Polypropylene glycol of molecular weight 2025 _____ 5.4
  Trichloromonofluoromethane _____ 13.6
  Boron trifluoride etherate _____ 1.8
  Diphenylmethane - di - isocyanate in amounts shown in Table II.

Additional amounts of boron trifluoride etherate also were added when diphenylmethane di-iso-cyanate was employed.

The foam was prepared by adding the diphenylmethane di-isocyanate to Mixture A and stirring for 30 seconds. The Mixture B with additional boron trifluoride etherate was then added and stirring continued for a further 6 seconds. The composition was then poured into a mould. The characteristics of the resulting foams are shown in Table II.

TABLE II

| Example | Diphenyl-methane di-isocyanate, percent | Additional boron trifluoride etherate employed, grams | Induction time, sec. | Rise time, sec. | Tack free time, sec. | Dimensional Stability, 2 inch cube at 70° C. and 100% relative humidity ||||
|---|---|---|---|---|---|---|---|---|---|
| | | | | | | Change after 96 hours, percent | Change after 10 days, percent | Change after 20 days, percent | Change after 30 days, percent |
| 5 | 0 | 0 | 46 | 70 | 70 | +13.3 | +16.0 | ¾" dia. cavity in core. | 1½" dia. cavity in core. |
| 6 | 2 | 0.2 | 45 | 75 | 8 | +12.2 | +15.0 | +17.3 | 1" dia. cavity in core. |
| 7 | 3 | 0.3 | 48 | 75 | 100 | +11.6 | +13 | +14.6 | ¾" dia. cavity in core. |
| 8 | 4 | 0.4 | 42 | 80 | 140 | +9.4 | +11 | +12.8 | Very slight cavity in core. |
| 9 | 5 | 0.45 | 48 | 85 | 160 | +9.4 | +12 | +16.1 | +18.* |

*No cavity developed.

EXAMPLE 10

The following two mixtures were prepared.

Mixture A: Grams
  3,4 - dihydro - 2H - pyran - 2 - methyl - (3,4 - dihydro - 2H - pyran - 2 - carboxylate) _____ 20
  2:2-di-p-hydroxyphenyl propane _____ 5
  Diphenylmethane di-isocyanate _____ 2
  Siloxane oxyalkylene copolymer type surfactant _____ 0.1
  Trichloromonofluoromethane _____ 6.5
Mixture B: Mls.
  Silver perchlorate, 5% weight/volume in 1:1 mixture of ethyl ether and polypropylene glycol of molecular weight 425 _____ 2
  Iodine, 10% weight/volume in 1:1 mixture of ethyl ether and polypropylene glycol of molecular weight 425 _____ 5

Mixture B was added to Mixture A over a period of 6 seconds with stirring. The composition foamed after an induction time of 50 seconds, with a rise time 56 seconds to a tack-free state.

What I claim is:
1. A foamed cellular polymeric material which is the reaction product of a foamable composition comprising:
  (a) a polymerizable dihydropyranyl compound of the formula:

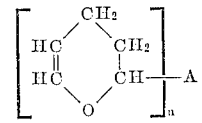

wherein $n$ is an integer which is 2 or 3, and A is a linking radical which contains an ether, ester or carbamate group, and has a valency equal to $n$;
  (b) a dihydropyranyl group-reactive compound selected from the group consisting of polyhydric phenols, polyhydric alcohols, epoxidized materials, polycarboxylic acids, polyamides, polycarbamates, and $\alpha,\beta$-monoethylenically unsaturated compounds, wherein the number of dihydropyranyl groups in (a) is greater than the number of dihydropyranyl group-reactive groups in (b), and wherein the sum of the weights of (a) and (b) are from about 58% to 97% by weight of the composition;
  (c) from about 2% to about 30% by weight of a volatile foaming agent;
  (d) from about 0.005% to about 2.0% by weight of a catalyst; and
  (e) from about 1% to about 10% by weight of an organic isocyanate.

2. A foamed cellular polymeric material as claimed in claim 1 wherein the polymerizable dihydropyranyl ingredient of the foamable composition is 3,4-dihydro-2H-pyran-2-methyl-(3,4-dihydro-2H-pyran-2-carboxylate).

3. A foamed cellular polymeric material as claimed in claim 1 wherein the organic isocyanate of the foamable composition is diphenylmethane diisocyanate.

4. A process for producing foamed cellular polymeric material comprising mixing together, under reacting conditions, a composition consisting essentially of:
  (a) a polymerizable dihydropyranyl compound of the formula:

$$\left[\begin{array}{c} HC \overset{CH_2}{\underset{O}{\diagup\diagdown}} CH_2 \\ HC \underset{}{\diagdown\diagup} CH \end{array} \right]_n \!\!-\!A$$

wherein $n$ is an integer which is 2 or 3, and A is a linking radical which contains an ether, ester or carbamate group, and has a valency equal to $n$;
  (b) a dihydropyranyl group-reactive compound selected from the group consisting of polyhydric phenols, polyhydric alcohols, epoxidized materials, polycarboxylic acids, polyamides, polycarbamates, and $\alpha,\beta$-monoethylenically unsaturated compounds, wherein the number of dihydropyranyl groups in (a) is greater than the number of dihydropyranyl group-reactive groups in (b), and wherein the sum of the weights of (a) and (b) are from about 58% to 97% by weight of the composition;
(c) from about 2% to about 30% by weight of a volatile foaming agent;
(d) from about 0.005% to about 2.0% by weight of a catalyst; and
(e) from about 1% to about 10% by weight of an organic isocyanate.

5. The process as claimed in claim 4 wherein the volatile foaming agent of the foamable composition is a chlorinated hydrocarbon.

6. The process as claimed in claim 4 wherein the volatile foaming agent of the foamable composition is trichloromonofluoromethane.

7. The process as claimed in claim 4 wherein the catalyst of the foamable composition is at least one member selected from the group consisting of fluoboric acid, fluosilicic acid, boron trifluoride, silver perchlorate and iodine.

8. The process as claimed in claim 4 wherein said reaction is in the presence of a surfactant.

9. The process as claimed in claim 8 wherein said surfactant is a siloxane oxyalkylene copolymer silicone surfactant.

References Cited by the Examiner
UNITED STATES PATENTS

| | | | |
|---|---|---|---|
| 3,022,256 | 2/1962 | Barnes et al. | 260—2.5 |
| 3,194,773 | 7/1965 | Hostettler | 260—2.5 |

FOREIGN PATENTS 610,417  5/1962  Belgium.

DONALD E. CZAJA, *Primary Examiner.*

LEON J. BERCOVITZ, *Examiner.*

F. McKELVEY, *Assistant Examiner.*